Oct. 5, 1971  H. DACH  3,610,070
HYDRAULIC CONTROL SYSTEM FOR BRAKES, CLUTCHES AND THE LIKE
Filed Feb. 17, 1970

INVENTOR:
Hansjörg Dach

By
Karl F. Ross
Attorney

United States Patent Office 3,610,070
Patented Oct. 5, 1971

3,610,070
HYDRAULIC CONTROL SYSTEM FOR BRAKES, CLUTCHES AND THE LIKE
Hansjorg Dach, Friedrichshafen, Germany, assignor to Zahnradfabrik Friedrichshafen Aktiengesellschaft, Friedrichshafen, Germany
Continuation-in-part of application Ser. No. 785,687, Dec. 20, 1968. This application Feb. 17, 1970, Ser. No. 12,112
Claims priority, application Germany, Feb. 19, 1969, P 19 08 162.0
Int. Cl. B60k *21/00;* F16h *57/10*
U.S. Cl. 74—753                                      10 Claims

ABSTRACT OF THE DISCLOSURE

A pair of hydraulic loads in the form of clutches and/or brakes are controlled by a common valve having separate inlet ports for high-pressure fluid and associated outlet ports respectively connected to these loads, each inlet port communicating with its associated outlet port in an initial position of a slider which, in response to pressure buildup in the first outlet port, shifts into an alternate position in which the fluid supply to the first load is reduced and the two leads are interconnected via a path only only in the alternate slider position; this shift occurs against a biasing force of a spring bearing upon a piston which is displaceable by hydraulic fluid from the first outlet port, delivered through a constricted passage, to augment the biasing force so as to re-establish the initial position after a further pressure rise at the first load, thereby admitting fluid to both loads at substantially the pressure prevailing at the two inlet ports.

---

Figure 1:
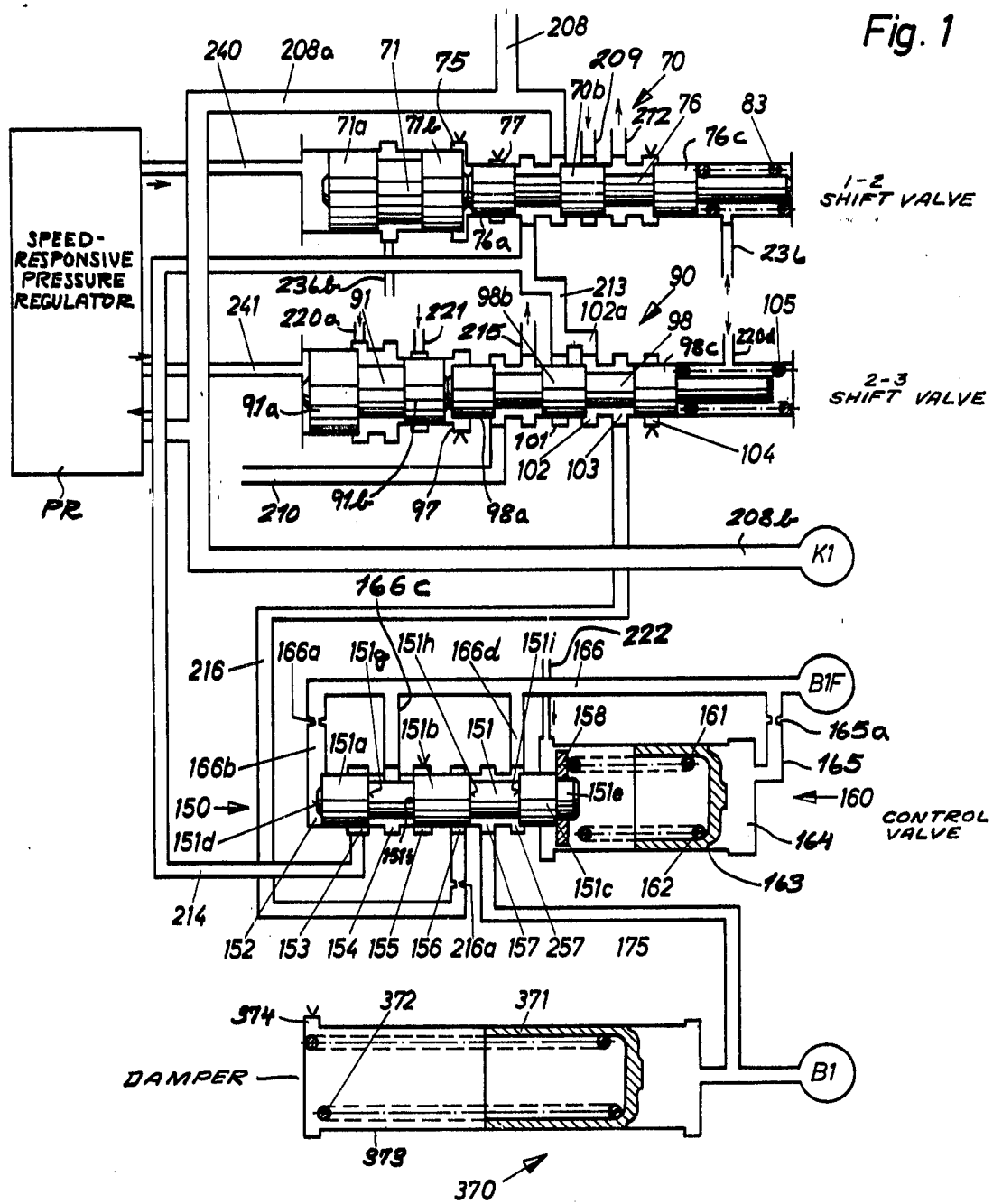

This application is a continuation-in-part of my co-pending application Ser. No. 785,687 filed Dec. 20, 1968, now Pat. No. 3,559,669. The present application also includes subject matter previously disclosed in my co-pending applications Ser. Nos. 817,984, filed Apr. 21, 1969, and 845,464, filed July 28, 1969.

My present invention relates to a fluid-operated load-control system as used, for example, in vehicular transmissions to vary the speed ratio between an input shaft and an output shaft.

In a typical transmission system of this type the two shafts are interconnected by planetary gearing normally having several degrees of freedom. By selectively arresting, or otherwise restricting the mobility of, different movable elements (inner sun gear, planetary-gear carrier, outer sun gear or ring gear) of the system, corresponding speed ratios can be established. This selective engagement of the movable elements is carried out by fluid-actuated— generally hydraulic—drive - establishing means, i.e. clutches and brakes designed to connect some of these elements with an associated shaft or to immobilize such elements with reference to the supporting frame or housing structure. Conventional transmissions of this character usually have three forward speeds (low, intermediate and high) and one reverse speed. The switchover between these various speeds may be controlled automatically, in response to changes in such operating parameters as throttle (accelerator) position and vehicle (wheel) speed, and/or manually.

The clutch and/or brake members serving to establish these various speed ratios, particularly those effective at intermediate speed (commonly referred to as "second gear"), must be capable of performing satisfactorily both during upshifting (from low speed or "first gear") and during downshifting (from high speed or "third gear"). Depending on whether the engine exerts traction, during normal driving, or drag, as on downhill rides or upon a sudden throttling of the fuel supply, these members are stressed in either one or the other direction of rotation. Since, generally, the stress in the "drag" direction will be less severe than that in the "traction" direction, it has already been proposed (see, for example, German Pat. No. 1,178,307) to split such a member into two independently actuatable parts, specifically a unidirectionally effective first brake and a bidirectionally effective second brake, the latter being needed only for drag so that its power rating may be considerably lower than that of the first brake.

In my application Ser. No. 785,687 I have disclosed a vehicular transmission system of the above character wherein two fluid-actuated devices such as brakes and/or clutches, controlling the torque ratio of the transmission, are to be operated under load with a gradual transition from the disengaged to the engaged state. In a specific embodiment described and illustrated in that application, the two devices are a unidirectionally effective first brake and a bidirectionally effective second brake of the hydraulic type, both these brakes being active in the intermediate-speed position whereas only the first brake is engaged in the high-speed position. According to the prior system, a valve means advantageously designed as a slider has a normal position in which a first and a second inlet port, separately connectable to a supply of high-pressure operating fluid, are respectively connected to a first and a second outlet port serving the controlled brakes and/or clutches. A land of the slider facing the first inlet port is acted upon by the supply pressure of that port to displace the slider into an off-normal position in which the flow of fluid to the first outlet port is restricted while the second outlet port is substantially completely cut off from its inlet port, with establishment of a gradually rising operating pressure lower than the supply pressure at the first outlet port and therefore at the first load (e.g. the unidirectionally effective brake). A biasing means such as a spring, opposing this displacement of the slider by the supply pressure, is aided by a progressively increasing restoring force exerted upon the slider by fluid delivered to the spring chamber through a throttled conduit extending from the first outlet port whereby the slider is returned to its normal position after a sufficient buildup of the fluid pressure applied to the first load. Upon such return, fluid from the second inlet port is allowed once more to flow to the second outlet port so as to actuate the corresponding load (e.g. a bidirectionally effective brake) with the full supply pressure.

Where, as in the particular embodiment primarily contemplated, the two control devices are brakes conjointly engageable with the same movable element such as an intermediate shaft of a planetary-gear system, the arrangement described causes a gradual braking of that shaft upon a shifting from a condition in which both brakes are unoperated to a condition wherein both are effective, specifically on upshifting from first to second gear. In third gear, the intermediate shaft controlled by these brakes is directly coupled with the drive shaft so that the second brake must be released whereas the first brake, being ineffectual for this direction of shaft rotation, may remain engaged without affecting the operation of the system. Upon a subsequent downshift to second gear, therefore, only the bidirectionally effective second brake need be actuated; with the first brake still under fluid pressure, the slider does not shift in that case so that the second brake responds immediately (though preferably with an effect slightly delayed by an associated damper).

An automotive transmission system incorporating the aforedescribed features operates satisfactorily in most instances since in first gear, when both brakes are released, the intermediate shaft controlled thereby rotates in the reverse direction so as to be promptly arrested upon actuation of the unidirectionally effective brake. It can happen, however, that the transmission output shaft at the moment of upshifting tends to outrun the input shaft (e.g. upon downhill driving) so that the intermediate shaft is driven forwardly, thus in a sense unaffected by a brake acting upon it through a one-way coupling such as an overrunning clutch. The object of my present invention, therefore, is to provide an improved system of this type in which the second controlled device, specifically the bidirectionally effective or directly coupled brake, becomes operative substantially concurrently with the first device and with the same gradual pressure buildup, designed to reduce wear and the generation of heat, so that both accelerating and decelerating torques can be promptly transmitted from the engine to the traction wheels of the vehicle.

This object is realized, pursuant to the present invention, by the provision of a second land on the aforedescribed valve means designed to establish a direct connection between the first and second outlet ports, and thus between the associated loads, in the off-normal position thereof whereby the gradually increasing operating fluid pressure applied to the first load is also communicated to the second load.

Advantageously, in accordance with a more particular feature of my invention, the first outlet has an extension blocked by the valve slider in its normal position but communicating with the second outlet port in the off-normal position thereof via a recess defined by two axially spaced slider heads, one of these heads carrying the aforementioned second land which cuts off the entrance to that extension in the normal slider position.

Figure 2:
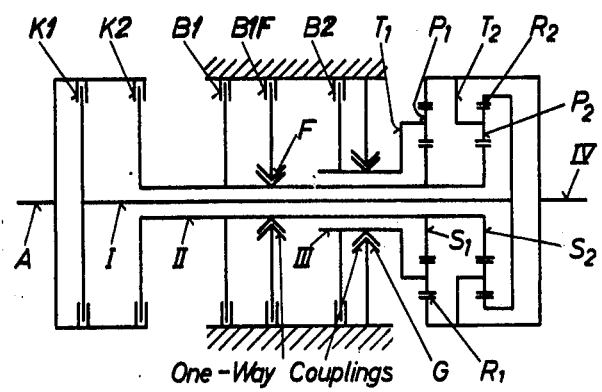

The invention will be described hereinafter in greater detail with reference to the accompanying drawing in which:

FIG. 1 is a longitudinal sectional view of a control system for an automotive transmission according to the invention, illustrated in an unstable position during upshifting from first to second gear; and FIG. 2 is a diagrammatic representation of a planetary transmission system provided with clutches and brakes controlled in part by the mechanism of FIG. 1.

In the description of the system of FIG. 1, elements shown in my three above-identified copending applications have been designated, so far as practicable, by the same reference numerals. They include a pair of shift valves 70 and 90, a control valve 150, an associated damper 160, a clutch K1, a unidirectionally effective brake B1F and a bidirectionally effective brake B1. Another clutch K2 and a further brake B2, not shown in FIG. 1, have been illustrated in FIG. 2. Shift valves 70 and 90, which control the switchover between first, second and third gear, may be actuated manually or automatically, the latter in response to such parameters as the position of an accelerator pedal and the speed of the wheels or of the drive (cardan) shaft of the vehicle.

Valves 70 and 90 are similar to each other and include each a piston 71 or 91 and a slider 76 or 98 integral therewith. The piston has two heads 71a, 71b or 91a, 91b whereas the slider has three heads 76a, 76b, 76c or 98a, 98b, 98c. The two piston heads 91a and 91b are somewhat different in diameter whereby hydraulic fluid such as oil, admitted under pressure to the intervening space through an inlet port 220a, tends to maintain the piston 91 and its slider 98 in their illustrated normal, left-hand position. Both pistons 71 and 91 are continuously urged toward the left by respective biasing springs 83 and 105 acting upon the heads 76c and 98c of their sliders; this action can be reinforced, under certain operating conditions not here material, by fluid entering their spring chambers through conduits 236 and 220d. Upon a shifting of the pistons to their off-normal positions, as illustrated for the valve 70, differential pressure can be exerted upon their differently dimensioned heads 71a, 71b and 91a, 91b by fluid arriving through respective conduits 236b and 221. The cylinders of these valves are further provided with ring channels 75 and 97 vented to the sump or the low-pressure side of a supply pump not shown, as indicated by V-shaped symbols in the drawing.

The displacement of valves 70 and 90 into their off-normal position, i.e. to the right in FIG. 1, occurs in response to fluid pressure delivered over respective conduit 240 and 241 from a speed-responsive pressure regulator PR which may include a centrifugal governor driven by the output shaft of the transmission, i.e. the shaft IV of FIG. 2. A conventional manual selector, not shown, controls the admission of hydraulic fluid at supply pressure to a conduit 208 from which a branch 208a leads to pressure regulator PR and a further branch 208b extends to clutch K1. The pressure in conduit 208 may vary with load, i.e. with the position of the accelerator (also not shown), in a manner not relevant for the purpose of the present invention but fully described in my prior application Ser. No. 845,464. The position of the selector also determines the supply of hydraulic fluid to conduits 236, 236b, 220a, 220d, 221 as well as to inlets 209 and 210 of valves 70 and 90, respectively.

Slider 76, when retracted to the left, connects inlet 209 with an outlet 212 leading to brake B2 whereby that brake can be operated at low speed (first gear) in certain selector positions in which conduit 209 receives fluid. In the reverse position of the selector, in which conduit 208 is drained, fluid reaches the brake B2 directly from the selector over a path independent of valves 70 and 90; under these circumstances, clutch K2 is operated by fluid passing through the unshifted valve 90 from conduit 210 through a conduit 215. Clutch K2 is also operable in the shifted position of valves 70 and 90, i.e. at high speed (third gear), by fluid passing from conduit 208 through valve 70 to a connection 213 having an extension 102a communicating with two ring channels 101 and 102, channel 101 being connected with conduit 215 in the shifted position of valve 90.

A conduit 214 branches off the inter-valve connection 213 and terminates at a ring channel 153 of control valve 150 which also has a slider 151 provided with three axially spaced heads 151a, 151b, 151c. A boss 151d at the free end of head 151a maintains a certain clearance 152 adjacent that head in the retracted (left-hand) position into which the slider is urged by a biasing spring 162 bearing upon a disk 158 which is seated on a boss 151e projecting from the opposite slider end at head 151c. Spring 162 is partly received in a cup-shaped plunger 161 whose outer face confronts a space 164 within its cylinder 163 communicating with a conduit 166 via a branch 165 containing a constriction 165a. Conduit 166, which terminates at at unidirectionally effective brake B1F, also has an extension 166b with a constriction 166a leading to clearance 152 behind slider head 151a. Two other branches 166c and 166d of conduit 166 enter the housing of the slider 151 via ring channels 154 and 257 which, in the illustrated off-normal slider position, communicate with two axial recesses respectively defined by heads 151a, 151b between edges 151g, 151f thereof and by heads 151b, 151c between their edges 151h and 151i. Other ring channels surrounding the slider 151 include a channel 155 vented to the sump, a channel 156 connected to an inlet duct 216, and a channel 157 communicating with an outlet duct 175. Line 216, which includes a constriction 216a, originates at a ring channel 103 of valve 90 which normally communicates with line 213 via ring channel 102 but which in the shifted valve position is vented to the sump through another ring channel 104. Line 175 leads to brake B1 and, in parallel therewith, to a damper 370 whose housing 373 contains a plunger 371 loaded by a compression spring 372 so as to yield in response to an initial pressure buildup in line 175. Housing 373 is vented at 374, i.e. behind the plunger 371.

Finally, a conduit 222 terminating at plunger housing 163 behind the disk 151 carries a fluid pressure which may be a function of some controlling parameter and which in this specific instance is assumed to vary in response to the position of the accelerator or gas pedal so as to rise with increasing loads while being always less than the supply pressure in conduit 208. Reference may also be made in this connection to commonly owned application Ser. No. 766,679 filed by me jointly with K. Sterk and W. Felder on Oct. 11, 1968, describing a valve for generating a controlled output pressure by selectively reducing the input pressure of hydraulic fluid supplied thereto.

I shall now describe the manner in which the displacement of valve 70, serving to shift from first to second gear, and the displacement of valve 90, serving to shift from second to third gear, operates the brakes B1F and B1 with the aid of control valve 150.

With the vehicle driven in low gear, valves 70, 90 and 150 are in their unoperated, left-hand positions. As soon as the vehicular speed sensed by pressure regulator PR increases sufficiently to let the fluid pressure in conduit 240 overcome the baising pressure of spring 83, pistons 71 and slider 76 of valve 70 shift to the right whereby hydraulic fluid from supply conduit 208 reaches conduits 213 and 214. If the output of pressure regulator PR is insufficient to shift also the valve 90, i.e. if its slider remains in the illustrated position, conduit 213 communicates with conduit 216 so that pressure fluid enters the ring channels 153 and 156 substantially simultaneously. From channel 153 the fluid enters the line 166 of brake B1F by way of channel 154 and outlet 166c; from channel 156 the fluid is delivered via channel 157 and line 175 to brake B1. Brake B1F quickly fills up to develop a reaction force which acts upon the land 151f of slider head 151b, its effect upon the confronting land 151g being neutralized or outweighed by the fluid pressure present in space 152. At this juncture the plunger 161 is at the right-hand end of its housing 163 so that spring 162 is relatively unstressed. As soon as the fluid pressure exceeds the spring pressure so as to shift the slider 151 to the right, boss 151d leaves the adjoining cylinder wall so that the rear face of slider head 151a is now fully exposed to the fluid pressure of line 166 as throttled by the constriction 166a, thereby accelerating the slider motion.

In its illustrated alternate position, slider 151 disconnects the operating conduit 175 of brake B1 from inlet duct 216 at edge 151h but establishes a direct connection between lines 166 and 175 via branch 166d whereby substantially the same fluid pressure is applied to brakes B1F and B1. This slider position, however, is unstable since the progressive buildup of fluid pressure in space 164, by way of throttle 165a, eventually moves the plunger 161 to the left to compress the spring 162 so as to increase the restoring force acting upon slider 151. In this unstable position, edge 151g partly cuts off the inlet 214 whereas edge 151f partly unblocks the drain 151b, the resulting pressure balance determining the fluid pressure in lines 166 and 175 along with the rate of pressure rise in space 164. It should be noted that the load-dependent fluid pressure introduced via conduit 222 opposes the advance of plunger 161.

Ultimately, however, the plunger comes into direct contact with disk 158 and returns the slider 151 to its left-hand position, at the same time cutting off the outlet of conduit 222. From now on, conduit 216 again communicates with brake B1 while the full fluid pressure of conduit 214 is applied to brake B1F.

If, now, the speed of the vehicle further increases so that pressure in line 241 forces also the piston 91 to the right, conduit 216 is disconnected from line 213 and is connected to the sump at channel 104 whereby the pressure in line 175 is quickly reduced and brake B1 releases. With the concurrent actuation of clutch K2 by the establishment of a connection between lines 213 and 215, the system is now in third gear.

In the case of a subsequent downshift, brake B1 is quickly reoperated as valve 90 returns to normal, thereby establishing the intermediate-speed power train since brake B1F is still engaged. Upon any further switchover between second and third gear, slider 151 is maintained in its left-hand position by the displaced plunger 161.

In FIG. 2 I have shown additional elements of the planetary-gear transmission system served by the clutches K1, K2 and the brakes B1, B1F and B2. The system comprises an input shaft A, several intermediate shafts I, II, III disposed in nested coaxial relationship, and the aforementioned output shaft IV. The clutches and brakes are schematically shown as including disks co-operating with hydraulically operable clamp jaws. Clutches K1 and K2 are actuatable to connect input shaft A with intermediate shaft I or II, respectively; brakes B1F and B1 serve to arrest the intermediate shaft II, whereas brake B2 fulfills the same function with reference to shaft III. Brake B1F is rendered unidirectionally effective by the interposition of a one-way coupling F, such as an overrunning clutch, between its disk and the shaft II. A similar one-way coupling G prevents reverse rotation of shaft III independently of brake B2.

Two planetary-gear assemblies include respective sun gears $S_1$, $S_2$ keyed to shaft II, a first ring gear $R_1$ keyed to output shaft IV, a second ring gear $R_2$ keyed to shaft I, and a pair of carrier disks $T_1$, $T_2$ supporting planetary gears $P_1$, $P_2$ respectively in mesh with gears $S_1$, $R_1$ and $S_2$, $R_2$. Planet carrier $T_1$ is rigid with shaft III whereas planet carrier $T_2$ is unitary with ring gear $R_1$.

The following table summarizes the engaged (+) and disengaged (−) positions of clutches K1, K2, brakes B1F, B1, B2, and one-way couplings F, G in the three forward-speed positions "low," "intermediate," and "high" as well as in reverse:

| | K1 | K2 | B1F | B1 | B2 | F | G |
|---|---|---|---|---|---|---|---|
| Low | + | − | − | − | + | − | + |
| Intermediate | + | − | + | + | − | + | − |
| High | + | + | + | − | − | − | − |
| Reverse | − | + | − | − | + | − | − |

I claim:

1. In a fluid-operated load-control system, in combination:

first and second fluid-actuatable drive-establishing means for controlling the torque ratio of a vehicular transmission;

valve means comprising a housing with a first and a second inlet port separately connectable to a supply of high-pressure operating fluid, a first outlet port connected to said first drive-establishing means, and a second outlet port connected to said second drive-establishing means, said valve means having a normal position connecting said first inlet port with said first outlet port and said second inlet port with said second outlet port, said valve means being provided with a first land facing said first inlet port for displacement by the supply pressure thereof into an off-normal position wherein said valve means restricts the flow of fluid to said first outlet port and substantially cuts off said second outlet port from said second inlet port, with establishment of a gradually rising operating pressure lower than said supply pressure at said first outlet port, said valve means being further provided with a second land directly connecting said first outlet port with said second outlet port in said off-normal position;

biasing means opposing such displacement of said valve means by said supply pressure; and throttle conduit means extending from said first outlet port to said biasing means for exerting thereon a force-increasing action in response to a predetermined rise in said operating pressure, thereby restoring said valve means to said normal position and reestablishing communication between said second inlet and outlet ports.

2. The combination defined in claim 1 wherein said biasing means comprises a piston with a face larger than said first land and a compression spring interposed between said valve means and said piston, said housing forming a cylinder for said piston with a fluid space remote from said spring adjacent said face, said conduit means opening into said fluid space.

3. The combination defined in claim 2 wherein said cylinder is provided with an additional port communicating with a source of variable fluid pressure less than said supply pressure bearing upon said piston to modify the magnitude of said predetermined rise in said operating pressure, said piston separating said additional port from said conduit means.

4. The combination defined in claim 2 wherein said valve means comprises a slider coaxial with said piston, said slider and said piston being provided with co-operating formations interengageable in a position of maximum compression of said spring for positively restoring said slider to its normal position.

5. The combination defined in claim 4 wherein said first outlet has an extension blocked by said slider in said normal position but communicating with said second outlet port in said off-normal position.

6. The combination defined in claim 5 wherein said slider is provided with three spaced-apart heads including a first and a second head defining a first recess co-operating with said first inlet and outlet ports and a third head defining with said second head a second recess co-operating with said second inlet and outlet ports, said housing further having a discharge port normally obstructed by said second head and positioned to be at least partly unblocked thereby for communication with said first recess in said off-normal position to control the magnitude of said operating pressure.

7. The combination defined in claim 6 wherein said extension terminates at said second recess in said off-normal position, said second land being part of said third head.

8. The combination defined in claim 6 wherein said housing forms a bore for said slider with a restricted pressure-equalizing connection from said first outlet to a location confronting said first head.

9. The combination defined in claim 1 wherein said first drive-establishing means is a unidirectionally effective hydraulic brake, said second drive-establishing means being a bidirectionally effective hydraulic brake.

10. In a hydraulic load-control system including an input shaft, an output shaft, planetary gearing interconnecting said shafts, and hydraulically operable drive-establishing means operatively coupled with said planetary gearing for establishing a low, an intermediate and a high speed ratio between said shafts, said drive-establishing means including a unidirectionally effective brake and a bidirectionally effective brake conjointly engageable with a movable element of said planetary gearing to establish said intermediate speed ratio, the combination therewith of:

valve means comprising a housing with a first and a second inlet port separately connectable to a supply of high-pressure operating fluid, a first outlet port connected to said first unidirectionally effective brake, and a second outlet port connected to said second bidirectionally effective brake, said valve means having a normal position connecting said first inlet port with said first outlet port and said second inlet port with said second outlet port, said valve means being provided with a first land facing said first inlet port for displacement by the supply pressure thereof into an off-normal position wherein said valve means restricts the flow of fluid to said first outlet port and substantially cuts off said second outlet port from said second inlet port, with establishment of a gradually rising operating pressure lower than said supply pressure at said first outlet port, said valve means being further provided with a second land directly connecting said first outlet port with said second outlet port in said off-normal position;

biasing means opposing such displacement of said valve means by said supply pressure; and throttled conduit means extending from said first outlet port to said biasing means for exerting thereon a force-increasing action in response to a predetermined rise in said operating pressure, thereby restoring said valve means to said normal position and reestablishing communication between said second inlet and outlet ports.

References Cited
UNITED STATES PATENTS

| | | | |
|---|---|---|---|
| 2,193,305 | 3/1940 | Thompson | 74—867 X |
| 2,832,231 | 4/1958 | Edsall | 74—868 |
| 3,004,447 | 10/1961 | Sand | 74—868 |
| 3,501,979 | 3/1970 | Forster et al. | 74—753 |

ARTHUR T. McKEON, Primary Examiner

U.S. Cl. X.R.

74—869